United States Patent [19]

Hinman

[11] Patent Number: 4,633,503
[45] Date of Patent: Dec. 30, 1986

[54] VIDEO ZOOM PROCESSOR

[75] Inventor: Daryl E. Hinman, Ridgecrest, Calif.

[73] Assignee: The United States of America as represented by the Secretary of the Navy, Washington, D.C.

[21] Appl. No.: 591,157

[22] Filed: Mar. 19, 1984

[51] Int. Cl.$^4$ .......................... G06K 9/42; H04N 1/04
[52] U.S. Cl. ...................................... 382/47; 382/41; 382/45; 358/287
[58] Field of Search ................. 358/287, 180, 140, 22; 382/44, 47, 45, 46, 51

[56] References Cited

U.S. PATENT DOCUMENTS

| | | | |
|---|---|---|---|
| 4,231,066 | 10/1980 | Merchant | 358/180 |
| 4,463,372 | 7/1984 | Bennett et al. | 358/22 |
| 4,484,347 | 11/1984 | Kashioka | 382/46 |
| 4,493,106 | 1/1985 | Farhangi et al. | 382/51 |

OTHER PUBLICATIONS

*Digital Image Processing*, W. K. Pratt, John Wiley & Sons, 1978, pp. 201–208.

Primary Examiner—Leo H. Boudreau
Assistant Examiner—Jose L. Couso
Attorney, Agent, or Firm—R. F. Beers; W. Thom Skeer

[57] ABSTRACT

A video zoom processor digitally processes video imagery information in a simultaneous two-dimensional format. Size and position transformation factors are incorporated in the image via processing. The size specification delay for the reduction factor is one video frame time and for the expansion factor it is zero video frame time. The specification delay for the position or translation factor is zero video frame time. Also implemented into the processed image is the pixel averaging algorithm in which each output pixel is the value of the weighted average of certain input pixels for purposes of gray level determination.

3 Claims, 12 Drawing Figures

Combined Block Diagram of Video Zoom Processor

On-Center Reduction

On-Center Expansion

Image Reduction

Image Expansion

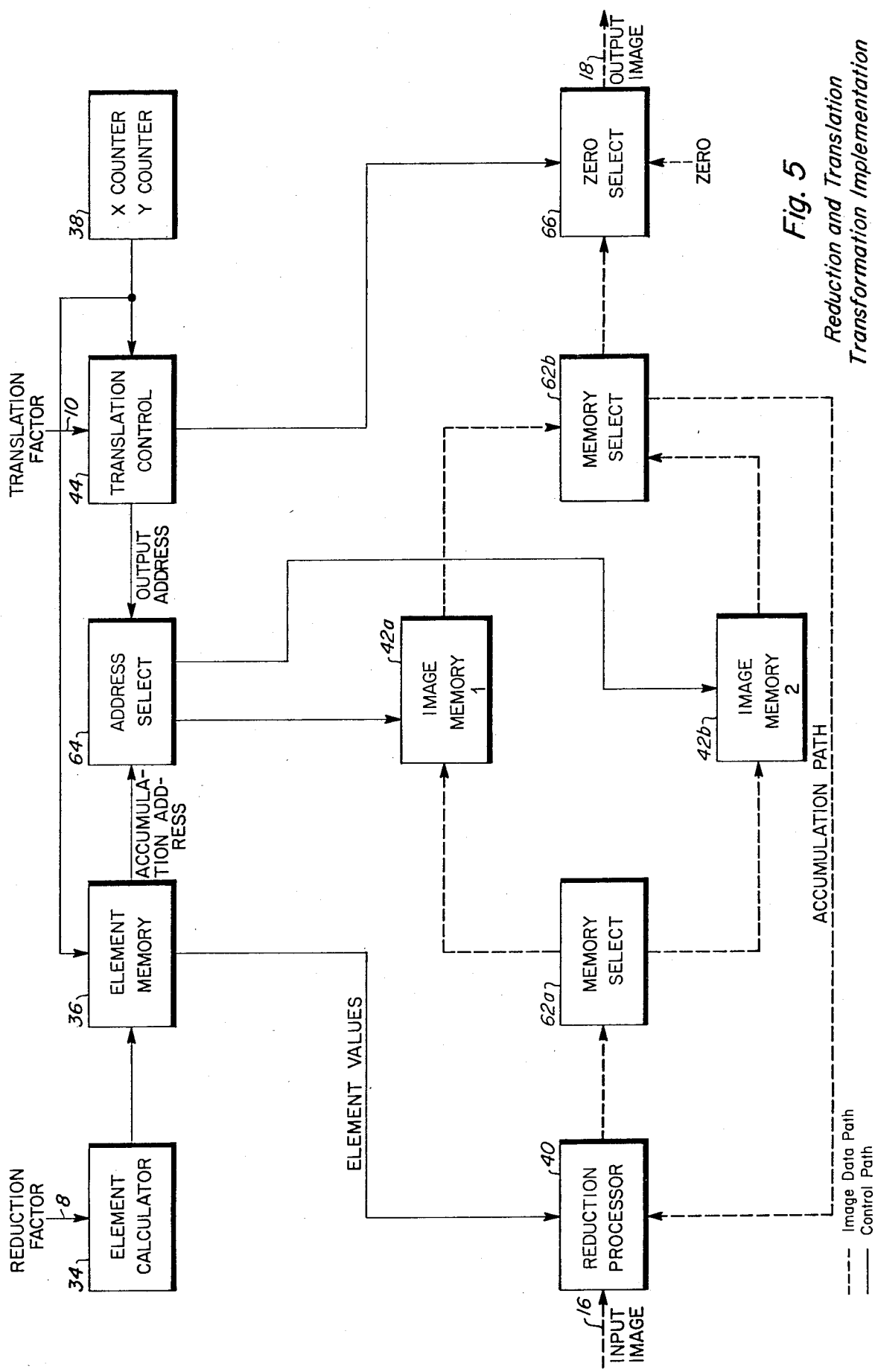

Reduction Processor and Element Memory

Expansion and Translation Transformation Implementation

----- Image Data Path
——— Control Path

Expansion Processor and Element Memory

Image Memory Grid Structure

Combined Block Diagram of Video Zoom Processor

VIDEO ZOOM PROCESSOR

BACKGROUND OF THE INVENTION

1. Field of the Invention

This invention relates to digital processing. More particularly, this invention pertains to digital processing of video imagery. With most particularly, imagery is generated in which an object within the scene is controlled in aspect, range, position, and intensity. One application is simulation of targets. Specifically it is useful for generating imagery for closed-loop simulations, autonomous target recognition algorithm development and tracker end-game signal processing algorithm development.

2. Description of the Prior Art

Methods to date of providing a simulated target variable in size and position require a significant period of processing time which restricts the usefulness of target simulation. These methods use two cascaded sections of one-dimensional processing, i.e., the image is processed in the horizontal direction and then in the vertical direction. The minimum total propagation delay from input to output is two video frame times. The delay between specification of the desired target position and size and the implementation of those specifications in an output image is the specification delay. The specification delay is also two frames. Such delays effectively prevent real-time target simulation via video digital processing.

SUMMARY OF THE INVENTION

The problems caused by the time delays inherent in prior art devices have been overcome by the present invention which was developed to reduce delays of image propagation while being digitally processed and delays between specification of desired output and implementation of that output. The delay of a video image from input to output of the invention is only one video frame time, i.e., near real-time. The specification delay for the reduction factor is one frame and for the expansion factor is zero frames. The specification delay for position is always zero frames. These features of near real-time are achieved by use of simultaneous two-dimensional processing of an image.

The invention, a video zoom processor (VZP), simulates the operation of an optical zoom lens. The VZP transforms a video input image (i.e., from a TV camera staring at an object from a fixed distance) into a scaled and translated video output image (i.e., the object has a different size and position). This invention (1) allows a high degree of resolution in the scale and translation factors, (2) allows the scale and translation factors to be stipulated immediately before the transformation occurs (i.e., non-preprogrammed operation) and (3) is performed in one video frame time (i.e., real-time operation). The size transformation operates in both the image reduction and image expansion modes to allow the full range of size simulation.

In image reduction each input pixel must be mapped into at most four adjacent output pixels. Therefore, in the reduction mode each sampled input pixel of the video frame is scaled, segmented and accumulated real-time into four locations in the image memory. The reduced output image is then read out of the image memory the next frame time. Image translation is obtained by approximately modifying the memory addressing upon read-out.

In image expansion each output pixel must be mapped from at most four adjacent input pixels. Therefore, in the expansion mode each sampled input pixel of the video frame is first written into the image memory. The next frame time each pixel of the expanded output image is formed real-time from a weighted combination of four input pixels read out of image memory. Image translation is accomplished by appropriately modifying the memory addressing upon read-out.

Accordingly, one object of the invention incorporating minimally reduced specification and propagation time delays is to provide for essentially real-time cloed-loop simulations of missile tracker performance in a controlled laboratory environment. In other words, the object of the invention is to provide for immediate scale and translation factor control affecting the output image of the processor.

In emphasis, the most important feature of this invention is the reduced specification delay for translation. This allows real-time, closed-loop simulation of high speed missile trackers.

Other objects, advantages and novel features of the invention will become apparent from the following detailed description of the invention when considered in conjunction with the accompanying drawing wherein.

BRIEF DESCRIPTION OF THE DRAWING

Further objects and advantages will become obvious to the person of ordinary skill when the following description of the preferred embodiment is studied in conjunction with the accompanying drawing figures wherein:

FIG. 5 shows the invention in a reduction mode;

DESCRIPTION OF THE PREFERRED EMBODIMENT

Figure 1:
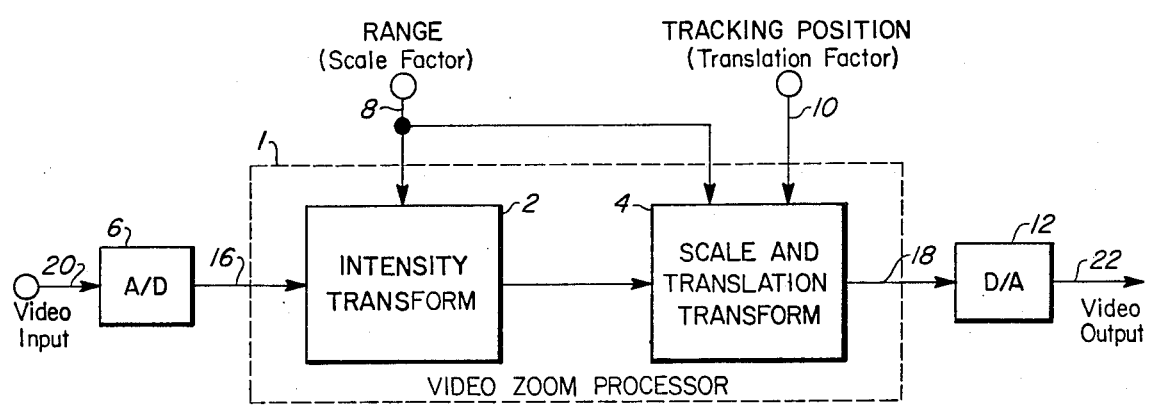
FIG. 1 is a block diagram of the invention and its relationship with the universe.

The preferred embodiment of the invention is discussed here in some detail in conjunction with the figures of the drawing wherein like parts are designated by like reference numerals, insofar it is possible and practical to do so.

The block diagram in FIG. 1 shows the overall invention and its relationship to an input image 16 and an output image 18. FIG. 1 shows a video zoom processor 1 having an intensity transform 2 and a scale and translation transform 4. A video input 20 is put into a digital format thus making it the input image 16 acceptable for the video zoom processor 1, by a digital-to-analog converter 6. The digitalized video input image 16 then goes into the intensity transform 2. The intensity transform 2 performs an input pixel intensity to output pixel intensity mapping as a function of a scale factor 8. The scale factor 8 is a range input. The output of the intensity transform 2 goes to the scale and translation transform 4. Two additional inputs to the scale and translation transforms 4 include the scale factor 8 and a translation factor 10. The desired reduction or expansion factor 8 simulates effective range change of the object of the input image. The desired translation factor 10 simulates effective position change of the object from on-center location. The function of the scale and translation transform 4 incorporates the reduction and expansion scaling modes. The output image 18 of the scale and translation transform 4 is the output image 18 of the video zoom processor 1. This output 18 goes to a digital to analog converter 12. The digital to analog converter 12 provides a video output 22.

The operation of the video zoom processor 1 involves the implementation of two-dimensional, discrete transformation mathematics via digital processing of imagery.

Any digitized (sampled) video image is mathmetically represented here by a matrix. Such matrix, an I by J size matrix [F] representing the form of the input image 16 to the video zoom processor 1, is defined as:

$$[F] = \begin{bmatrix} F(0,0) & F(0,1) \ldots F(0,J-1) \\ F(1,0) & F(1,1) & . \\ . & . \\ . & . \\ F(I-1,0) \ldots & F(I-1,J-1) \end{bmatrix} \quad (1)$$

F(i,j) is a sampled element (i.e., pixel) of the input image 16. Similarly, an I by J size matrix [G] representing the output image is defined as:

$$[G] = \begin{bmatrix} G(0,0) & G(0,1) \ldots G(0,J-1) \\ G(1,0) & G(1,1) & . \\ . & . \\ . & . \\ G(I-1,0) \ldots & G(I-1,J-1) \end{bmatrix} \quad (2)$$

G(i,j) is a sampled element of the output image 18.

The I×J length vector $\bar{f}$, obtained by row scanning the matrix [F] to represent the vector form of the input image, is defined as:

$$\bar{f} = [F(0,0), F(0,1), \ldots, F(0,J-1), F(1,0), F(1,1), \ldots, \quad (3)$$
$$F(I-1,J-1)]^T$$

Similarly, the I×J length vector $\bar{g}$, obtained by row scanning the matrix [G] to represent the vector form of the output image, is defined as:

$$\bar{g} = [G(0,0), G(0,1), \ldots, G(0,J-1), G(1,0), G(1,1), \ldots, \quad (4)$$
$$G(I-1,J-1)]^T$$

Figure 2:
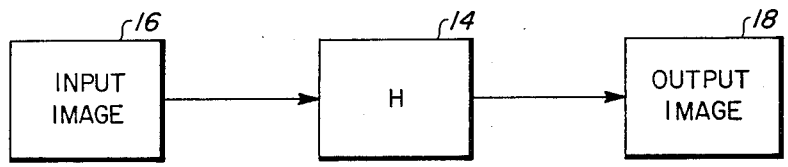
FIG. 2 is a block diagram representing the invention mathematically as a two-dimensional linear operator.

In FIG. 2 the relationship of a two-dimensional linear operator [H] 14 to input and output images is illustrated. The linear operator 14 mathematically represents the video zoom processor. The two-dimensional linear operator [H] 14 is an (I×J) by (I×J) size matrix. Its application to the input image vector $\bar{f}$ results in the output image vector $\bar{f}$ as noted here.

$$\bar{g} = [H]\bar{f} \quad (5)$$

For an image scaling transformation this operator 14 is both noninvertable and separable. Noninvertability is not critical to the invention, whereas separability is. The operator 14 is noninvertable, i.e., no inversion of [H] 14 exists, because [H] 14 is singular. Since there is no inversion of [H] 14, the original input image 16 cannot be obtained from the scaled output image 18.

Separability implies that the two-dimensional operator 14 can be separated into two one-dimensional row and column operators. A column operator [U] is defined to be an I by I size matrix and a row operator [V] is defined to be a J by J size matrix. The relationship between the column and row operators is stated as:

$$[H] = [V] \; X \; [U] \quad (6)$$

The symbol X denotes a left direct product operation. (See *Digital Image Processing* by W. K. Pratt; published by John Wiley & Sons, 1978.) Thus in light of the above discussion the output image 18 is represented as:

$$[G] = [U][F][V]^T \quad (7)$$

The T indicates the matrix transpose operation.

To clarify the above utilized mathematics, the product [C]=[A][B] of two matrices requires the number of columns of [A] to equal the number of rows of [B]. For instance an M by N product matrix [C] of an M by K matrix [A] and a K by N matrix [B] is a matrix whose general element, for m=0 to (M−1) and n=0 to (N−1), is given by:

$$C(m,n) = \sum_{k=0}^{K-1} A(m,k)B(k,n) \quad (8)$$

For p=0 to (I−1) and q=0 to J−1) and in which U(p,i), F(i,J), and V(q,j) are elements of matrices [U], [F], and [V], respectively, one can decompose equation (7), by using equation (8), into $$G(p,q) = \sum_{i=0}^{I-1} \sum_{j=0}^{J-1} U(p,i)F(i,j)V(q,j) \quad (9)$$

Equation (9) is the basis for implementing the processing method.

Figure 3A:
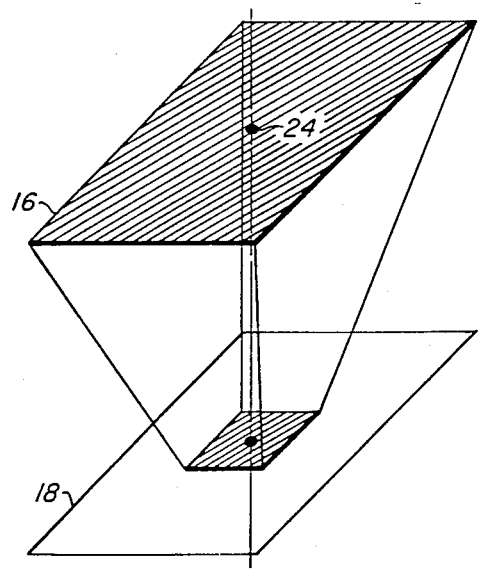
FIGS. 3A and 3B illustrate on-center reduction and expansion.
Figure 3B:
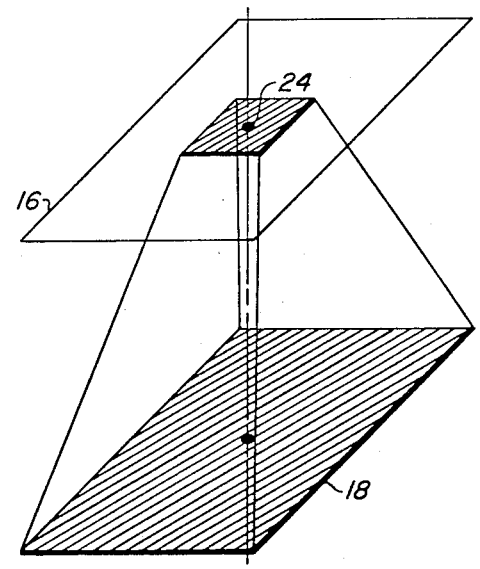

The scale transform 4 in FIG. 1 refers to image scaling. Image scaling has two modes—image reduction and image expansion. Reduction and expansion are defined around an image center 24 as depicted in FIG. 3. For hardware implementation of the scaling transform 4 a method for calculating the one-dimensional scaling matrix operators, [U] and [V], was developed. Since [U] and [V] have identical properties, despite operation on columns and rows, respectively; only the method of calculating operator [U] is demonstrated.

Consider operator [U] in the image reduction mode. Define the number of column elements in the input image 16 to be L, the reduced number of column elements in the output image 18 to be N, and the one-dimensional reduction factor to be $K_r$ which equals N/L. $K_r$ is less than one. In reduction each output column element is defined to be an average of $1/K_r$ input column elements. As an example, the input and output for a reduction of ½ (i.e., N=4, L=8) are shown for simplicity as one-column images below where 0=background level.

$$[F] = \begin{bmatrix} a \\ b \\ c \\ d \\ e \\ f \\ g \\ h \end{bmatrix} \quad [G] = \begin{bmatrix} 0 \\ 0 \\ (a+b)/2 \\ (c+d)/2 \\ (e+f)/2 \\ (g+h)/2 \\ 0 \\ 0 \end{bmatrix}$$

For $[G] = [U][F]$, $[U]$ results as:

$$[U] = \begin{bmatrix} 0 & 0 & 0 & 0 & 0 & 0 & 0 & 0 \\ 0 & 0 & 0 & 0 & 0 & 0 & 0 & 0 \\ 1/2 & 1/2 & 0 & 0 & 0 & 0 & 0 & 0 \\ 0 & 0 & 1/2 & 1/2 & 0 & 0 & 0 & 0 \\ 0 & 0 & 0 & 0 & 1/2 & 1/2 & 0 & 0 \\ 0 & 0 & 0 & 0 & 0 & 0 & 1/2 & 1/2 \\ 0 & 0 & 0 & 0 & 0 & 0 & 0 & 0 \\ 0 & 0 & 0 & 0 & 0 & 0 & 0 & 0 \end{bmatrix}$$

In light of this example and other calculations for various reduction factors, the properties revealed for a column or row reduction matrix operator are listed below.

1. The elements in a row always sum to 0 or 1.
2. The elements in a column always sum to the reduction factor $K_r$.
3. There are at most two nonzero elements in any column, so there are at most $2 \times L$ nonzero elements in the matrix.
4. The position of the first nonzero element in the first column is $(L-N)/2$.

Next consider operator $[U]$ in the expansion mode. Define the number of column elements to be expanded from the input image 16 as N, the number of column elements in the output image 18 as L, and the one-dimensional expansion factor as $K_e$ which is equal to L/N which is greater than one. In expansion each input column element is defined to be the average of $K_e$ column elements. As an example, the input and output for an expansion of 2 (N=4, L=8) are shown for simplicity as one column images below. The letter "x" stands for "does not care".

$$[F] = \begin{bmatrix} x \\ x \\ a \\ b \\ c \\ d \\ x \\ x \end{bmatrix} \quad [G] = \begin{bmatrix} a \\ a \\ b \\ b \\ c \\ c \\ d \\ d \end{bmatrix}$$

For $[G] = [U][F]$, $[U]$ is uniquely given by:

$$[U] = \begin{bmatrix} 0 & 0 & 1 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 1 & 0 & 0 \end{bmatrix}$$

Observing this example and others for different expansion factors, the following properties are stated below for a column or row matrix operator.

1. The elements in a row always sum to 1.
2. The elements in a column always sum to 0 or the expansion factor $K_e$.
3. There are at most two nonzero elements in any row; so there are at most $2 \times L$ nonzero elements in the matrix.
4. The position of the first nonzero element in the first row is $(L-N)/2$.

With the above properties, algorithms can easily be generated to calculate the matrix operators, $[U]$ and $[V]$, for variable reduction/expansion factors. The following table lists two programs which implement these algorithms for any even integers L and N.

| REDUCTION PROGRAM | EXPANSION PROGRAM |
| --- | --- |
| 10 Matrix U = 0 | 10 Matrix U = 0 |
| 20 I = (L − N)/2 | 20 J = (L − N)/2 |
| 30 J = 0 | 30 I = 0 |
| 40 F = L | 40 F = L |
| 50 IF J ≥ L then 180 | 50 IF I ≥ L then 180 |
| 60 IF F ≤ N then 110 | 60 IF F ≤ N then 110 |
| 70 U(I,J) = N/L | 70 U(I,J) = 1 |
| 80 F = F − N | 80 F = F − N |
| 90 J = J + 1 | 90 I = I + 1 |
| 100 GOTO 50 | 100 GOTO 50 |
| 110 U(I,J) = F/L | 110 U(I,J) = F/N |
| 120 I = I + 1 | 120 J = J + 1 |
| 130 IF I > L then 180 | 130 IF J > L then 180 |
| 140 U(I,J) = (N − F)/L | 140 U(I,J) = (N − F)/N |
| 150 F = L − (N − F) | 150 F = L − (N − F) |
| 160 J = J + 1 | 160 I = I + 1 |
| 170 GOTO 50 | 170 GOTO 50 |
| 180 END | 180 END |

As noted above, the reduction and expansion operators have an exact relationship. So if $[U_k]$ is a matrix operator for a reduction/expansion factor of K, then:

$$[U_k] = K[U_{1/K}]^T \tag{10}$$

The same relationship applies to $[V]$.

The pixel averaging algorithm demonstrated here has less edge shape distortion than a zero-order (i.e., nearest neighbor) interpolation algorithm and less edge softening than a first-order (i.e., bilinear) interpolation algorithm during expansion. (See *Digital Image Processing* by K. R. Castlemen; published by Prentice Hall, 1979.) For some image generation purposes, minimization of these undesirable effects is important to maintain object edge quality. Thus the pixel averaging algorithm was selected although others could be implemented.

The implementation of the above algorithms or programs into the video zoom processor 1 of FIG. 1 is described here. As noted above, the intensity transformation 2 performs an input pixel intensity to output pixel intensity mapping as a function of the range 8, which is constant during a given video frame. The intensity transform 2 is implemented with a look-up table operation using programmable read only memory (PROM) capable of operating at the pixel rate. Such implementation allows any desired nonlinear function to be programmed for simulation of range-related intensity variations.

The scale and translation transformations 4 are shown as a single block in FIG. 1 because the implementation of both is accomplished by the same hardware. This hardware is configured differently, however, for the reduction and expansion scaling modes.

First scaling transformation 4 is noted. Processing both dimensions of the input image 16 is an implementation of equation 5, $\bar{g}=[H]\bar{f}$. Only one video frame time is needed to perform this transformation 4. The matrix operator [H] for the desired scale factor must be determined prior to performing the transformation 4. Only the value and location of the nonzero elements of [H] must be determined since the zero elements do not contribute to the output image 18 (i.e., zero times anything equals zero). If one takes an L by L size image, for example, there are $2L \times 2L = 4L^2$ nonzero elements in [H] (viz., if L=500, then $4L^2=10^6$). This method of calculation is not practical. However, a better technique is provided by the matrix multiplication decomposition equation 9 set forth above and repeated here for p=0 to (I−1) and q=0 to (J−1).

$$G(p,q) = \sum_{i=0}^{I-1} \sum_{j=0}^{J-1} U(p,i)F(i,j)V(q,j) \qquad (9)$$

By this equation, any output element G(p,q) is uniquely defined as the sum of products of the column operator matrix [U] elements, the input matrix [F] elements, and the row operator matrix [V] elements. The nonzero elements of [H] do not have to be determined prior to performing the transformation. Instead these elements are determined as needed while the transformation is being performed, using nonzero elements of [U] and [V]. Thus only the value and location of the nonzero elements of [U] and [V] need to be determined prior to performing the transformation. For an L by L image there are $2L+2L=4L$ nonzero elements in [U] and [V] (viz., if L=500 then $4L=2\times 10^3$ which is a feasible calculation). Current microprocessor speeds allow calculation and storage of the nonzero elements in a random access memory (RAM) using the above equation (9) in a fraction of a video frame time.

Figure 4:
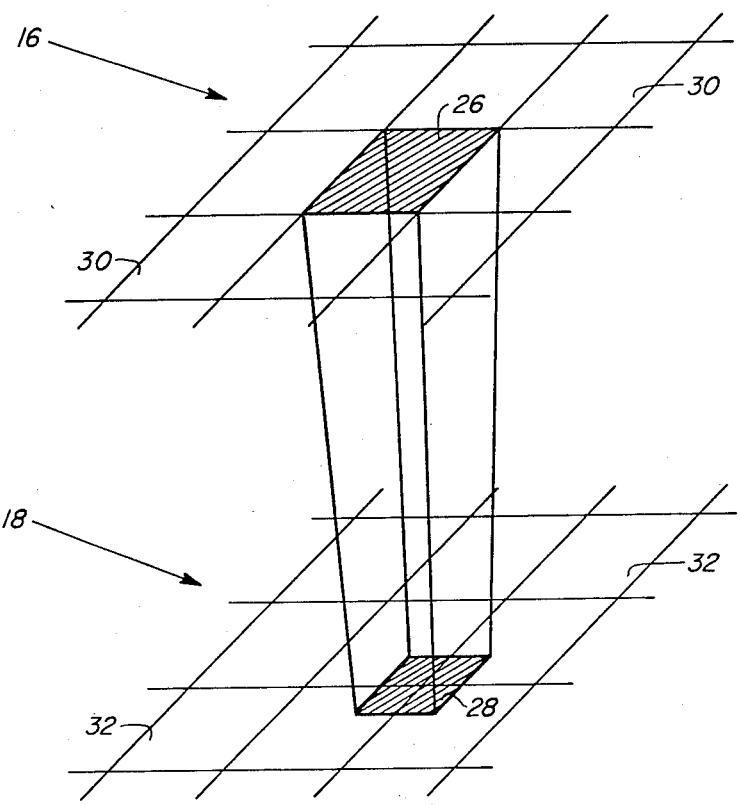
FIG. 4 schematizes image reduction.

Image reduction of the video zoom processor is depicted in FIG. 4. In FIG. 4 an input pixel 26 is projected onto a portion 28 of the output image 18. The location of this projection 28 is determined by both the translation factor and the reduction factor which compose the scale and translation transform 4. The reduced input pixel 28 is part of no more than four output pixels 32. In summary, the processing for reduction of an image consists of each incoming input image pixel 30 being appropriately scaled, segmented, and accumulated into four adjacent locations of an image memory (RAM) 42 at real-time rates. This process takes one video frame time. The following video frame time, the reduced output image 18 is read out of the image memory 42 of FIG. 5.

Implementation of the reduction and translation transformation is diagrammed in FIG. 5. The desired reduction factor is fed into the element calculator (microprocessor) 34 so that the on-center-reduction matrix nonzero element values and locations can be calculated and stored in the element memory 36 (RAM), immediately prior to the input of the image 16. The X-Y position within the input and output images is continuously provided by the X and Y counters 38. These counters 38 address the element memory 36, to select element values for use in the reduction processor 40 and to select element locations for use as the accumulation address in the image memory 42. These counters 38 also provide the output address in the image memory 42. The reduction processor 40 scales the incoming input image pixel 26 by the reduction factor and segments the result 28 into four parts. Each part of 28 is then accumulated into four adjacent locations 32 in the image memory 42. There are two image memories, 42a and 42b, which alternate operation modes every frame. While one memory, 42a or 42b, is randomly accumulating from the reduction processor 40 (read to processor/write from processor mode), the other memory, 42b or 42a, is outputting the previously reduced image (read to output/write zero mode). Any desired image translation is obtained by appropriately modifying the on-center-reduction image memory output pixel address in a translation control 44 immediately before the image output 18 (this implies near zero time delay for the translation transformation 4). When a translation off the edge of the defined (stored) output image 18 occurs, a zero (background level) is inserted for that output image pixel 32.

Operation of the reduction processor 40 in conjunction with the element memory 36 and the image memory 42 can be explained in view of above equation 9.

$$G(p,q) = \sum_{i=0}^{I-1} \sum_{j=0}^{J-1} U(p,i)F(i,j)V(q,j)$$

Take input pixel 26 F (i,j) for example to be processed. Equation 9 provides how F(i,j) is to be segmented and in which output pixels 32 the segments 28 should be accumulated. Given F(i,j), i defines a column in matrix [U] and j defines a column in matrix [V]. Since any column of a reduction operator matrix has only two nonzero elements, there are only two possible U(p,i)'s and V(q,j)'s. Thus there are only four possible output pixels 32 G(p,q) that F(i,j) can be a part of. An input pixel 26 is partitioned into at most four output pixels 32 which compose image 18 as noted in the geometrical illustration of the reduction process in FIG. 4. Mathematically this process is expressed by the following expressions.

Given

F(i,j)

This defines $U(p_1,i)$, $U(p_2,i)$, $V(q_1,j)$, $V(q_2,j)$

Figure 6:
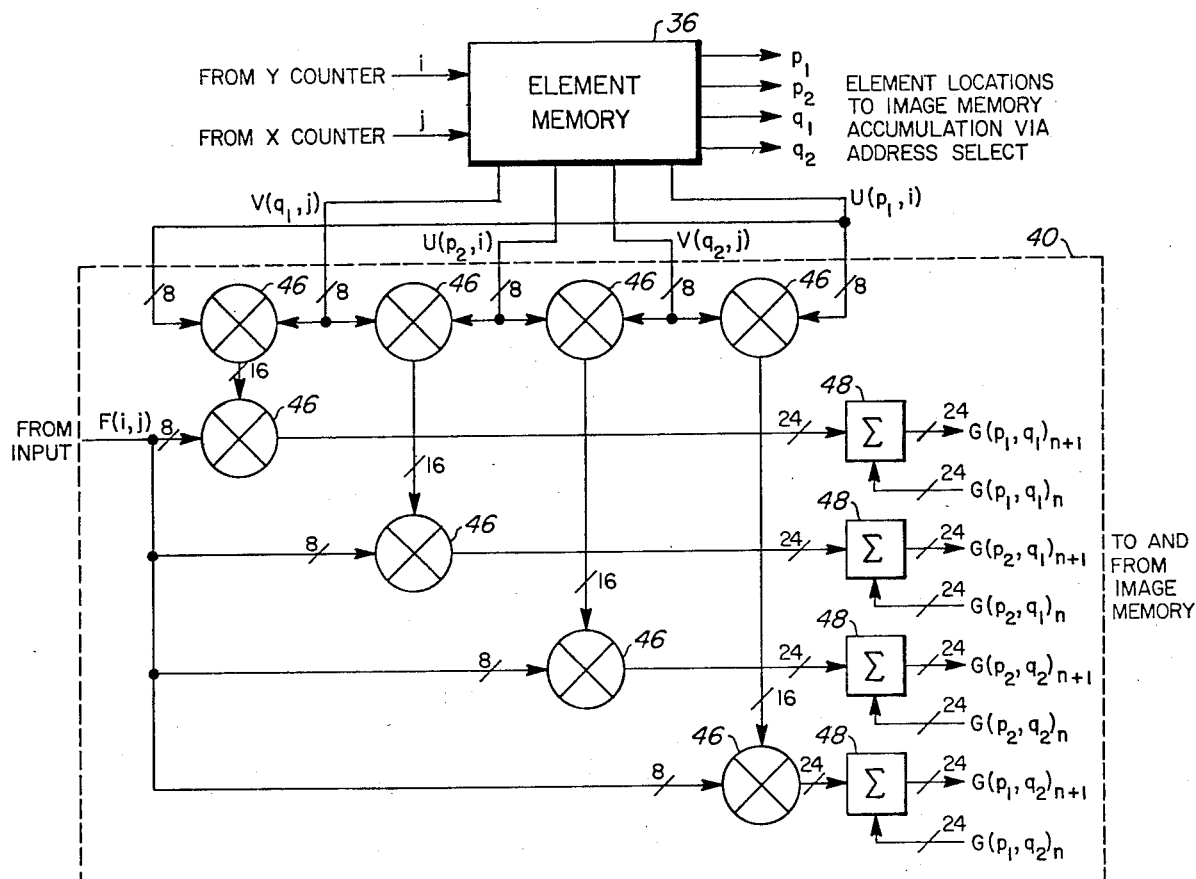
FIG. 6 is a schematic of the reduction processor.

Then solve for $G(p_1,q_1)_{n+1} = U(p_1,i)F(i,j)V(q_1,j) + G(p_1,q_1)_n$ $G(p_1,q_2)_{n+1} = U(p_1,i)F(i,j)V(q_2,j) + G(p_1,q_2)_n$ $G(p_2,q_1)_{n+1} = U(p_2,i)F(i,j)V(q_1,j) + G(p_2,q_1)_n$ $G(p_2,q_2)_{n+1} = U(p_2,i)F(i,j)V(q_2,j) + G(p_2,q_2)_n$ The implementation of the above expressions which constitute the reduction processor 40 is illustrated in FIG. 6.

The reduction processor 40, as schematized in FIG. 6, has eight multipliers 46 and four adders 48. Of the multipliers 46, a first, second, third, and fourth multiplier each have an output and a first input and a second input from element memory 36, while a fifth, sixth, seventh, and eighth multiplier each have a first input from the output of one of the other four multipliers, a second input from the input image 16 as indicated in FIGS. 5 and 6, and an output to a first input of each adder 48 as shown in FIG. 6. Each adder 48 also has a second input and an output which, as noted in FIG. 6, interface reduction processor 40 with an image memory 42a or 42b as shown in FIGS. 5 and 6, the second adder input being interfaced via an output of a second memory select 62b and the adder output being interfaced via an input of a first memory select 62a.

Figure 7:
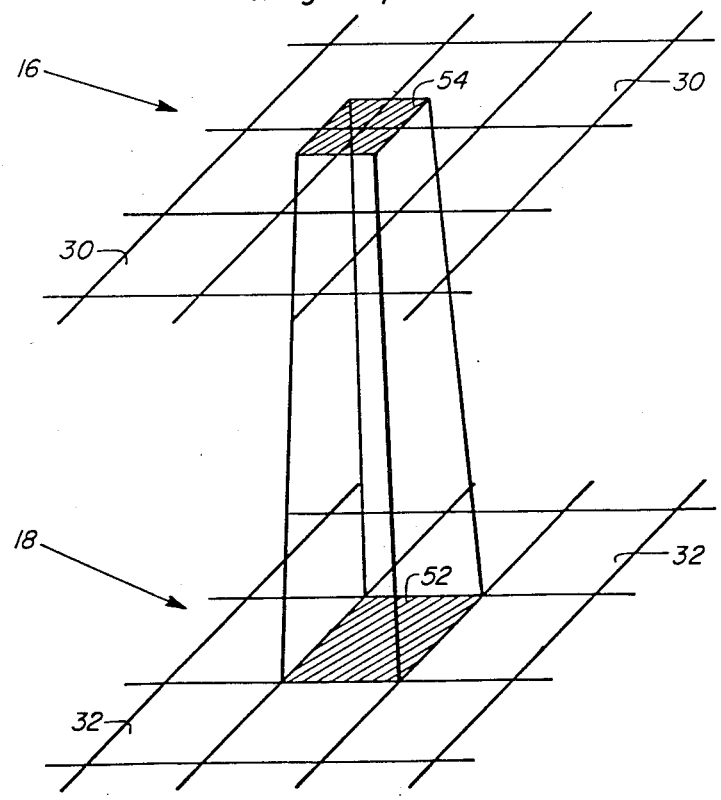
FIG. 7 schematizes image expansion.

Image expansion of the expansion processor 50 is geometrically depicted in FIG. 7. An output pixel 52 is formed by a projection from some portion 54 of the input image 16. The size of the projection 54 is determined by the expansion factor. The location of the projection 54 is determined by both the expansion factor and the translation factor. The expanded output pixel 52 is formed from no more than four input pixel 30 segments.

Figure 8:
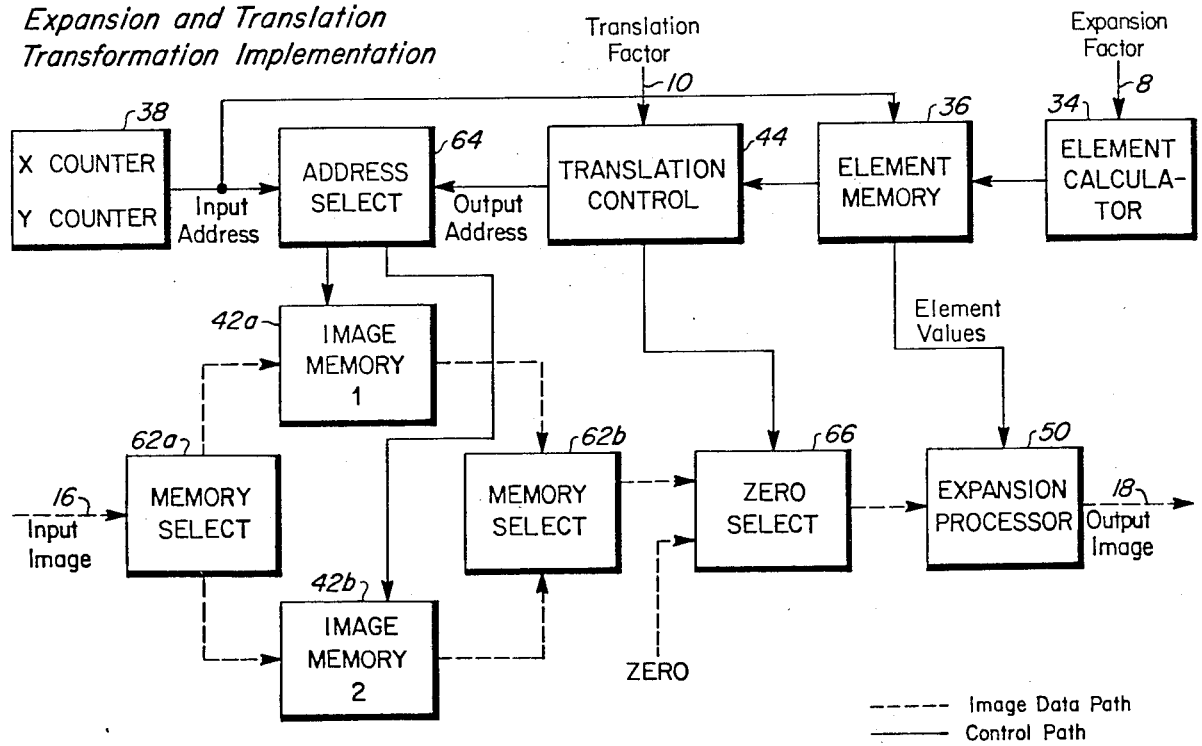
FIG. 8 shows the invention in an expansion mode.

In summary, the processing for expansion of the image includes the entire input image 16 being written into the image memory 42 of FIG. 8, which takes one video frame time; and in the next video frame time, the output image pixels 52 are formed at a real-time rate from weighted combinations of four adjacent input image pixels 30 read out of the image memory 42.

FIG. 8 illustrates implementation of the image expansion and translation transformation. The specified expansion factor is fed into the element calculator 34 so that the on-center-expansion matrix nonzero element values and locations can be calculated and stored in the element memory, immediately prior to the output of the image 18. The X-Y position within the input and output images is continuously provided by the X and Y counters 38. These counters 38 address the element memory 36 to select element values for use in the expansion processor 50 and to select element locations for use as output addressing in the image memory 42. These counters 38 also provide the input address in the image memory 42. There are two image memories, 42a and 42b, which alternate operation modes every frame. While one memory, 42a or 42b, is storing the input image 16 (write from input mode), the other memory, 42b or 42a, is outputting selected pixels 30 of the previously stored input image 16 to the expansion processor 50 (read to processor mode). The expansion processor forms each output pixel 52 from weighted combinations of the four adjacent input image pixels 54 selected from the image memory 42. Any desired translation is obtained by appropriately modifying the on-center-expansion image memory 42 output pixel addressing in the translation control 44 immediately before image output 18 (this implies near zero time delay for the translation transformation). When a shift off the edge of the defined (stored) input image 16 occurs, a zero (background level) is inserted for that input image pixel 30.

The operation of the expansion processor 50 in conjunction with the element memory 36 and the image memory 42 can be mathematically explained in light of equation (9):

$$G(p,q) = \sum_{i=0}^{I-1} \sum_{j=0}^{J-1} U(p,i)F(i,j)V(q,j)$$

This equation (9) defines the output pixel 52 which is G(p,q). This equation indicates how much of and what input pixels must be combined to form the output pixel 52, viz., G(p,q). Given G(p,q), p defines a row in the matrix [U] and q defines a row in the matrix [V]. Since any row of an expansion matrix operator has at most two nonzero elements, there are only two possible nonzero U(p,i)'s and V(p,j)'s. Thus only four possible input pixels 30 F(i,j) are needed to form G(p,q). That is, an output pixel is formed from at most four input pixels 30. This description of the expansion process is illustrated in FIG. 7. The descriptive mathematical expressions of this process are noted here.

Given $$G(p,q)$$

This defines $$U(p, i_1), U(p,i_2), V(q,j_1), V(q,j_2)$$

Then solve for $$G(p,q) = U(p,i_1)F(i_1,j_1)V(q,j_1) + U(p,i_1)F(i_1,j_2)V(q,j_2) + U(p,i_2)F(i_2,j_1)V(q,j_1) + U(p,i_2)F(i_2,j_2)V(q,j_2)$$

Figures 9, 10:
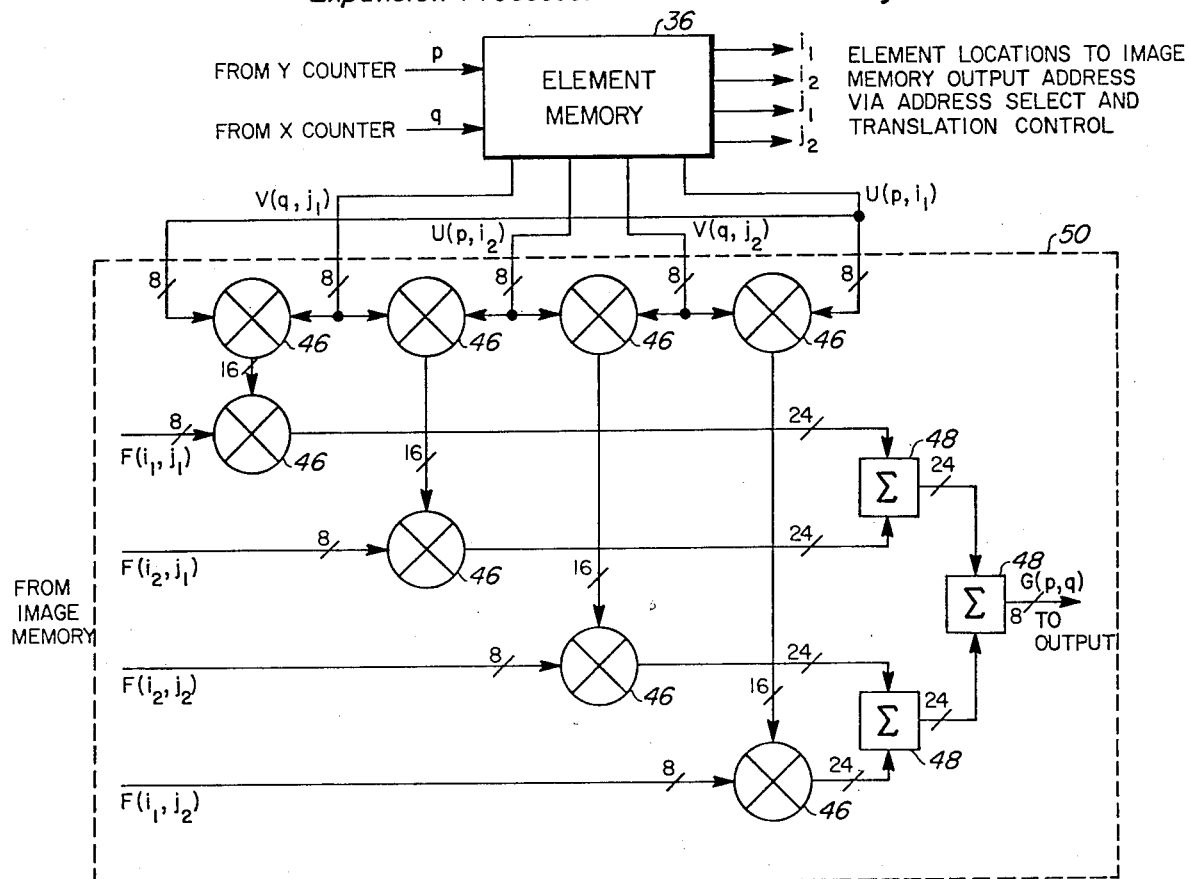
FIG. 9 is a schematic of the expansion processor.
FIG. 10 illustrates the image memory structure.
Figure 11:
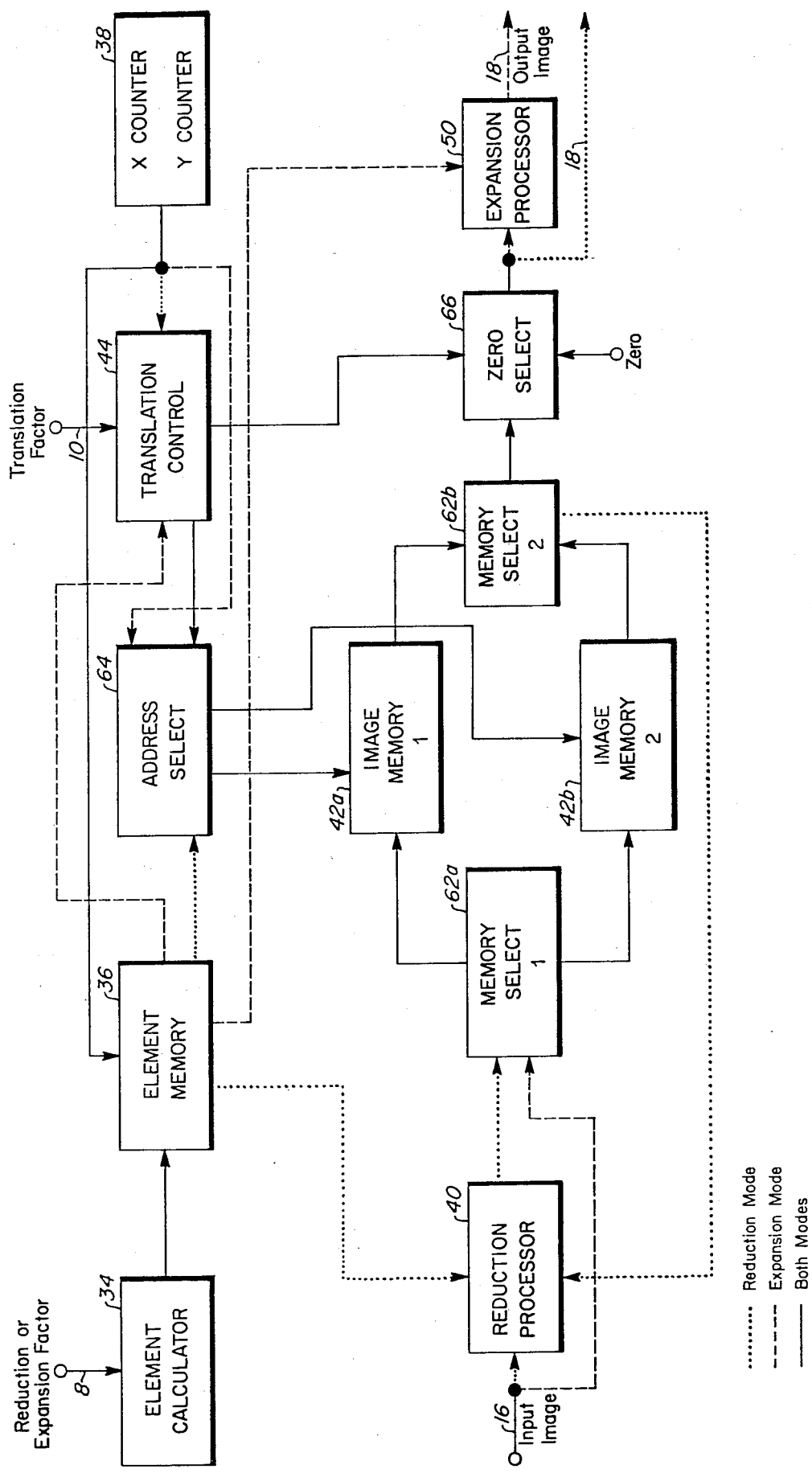
FIG. 11 is a block diagram of the invention incorporating all modes of operation.

FIG. 9 is a block diagram of the expansion processor 50 that implements the above mathematical expressions.

Much of the hardware required for the expansion implementation is the same as for the reduction implementation. The same hardware is used for multiplexing between the two modes of expansion and reduction. Very high speed digital logic and memory are used to maintain the pixel rate and pipeline operation required. The input and output video operate synchronously (exactly one frame delayed) by using the video vertical retrace times to make up for system propagation delay times.

The expansion processor 50, FIGS. 8 and 9, utilizes much of the same hardware as the reduction processor 40, FIGS. 5 and 6, but such hardware is configured differently in certain respects for processor 50 than for processor 40. A first, second, third, and fourth of the multipliers 46 and the connections from each thereof to element memory 36 and to a fifth, sixth, seventh, and eighth of these multipliers are the same in both processors. However, in expansion processor 50, as noted in FIG. 9 and as may be seen from FIG. 8, each first input of the fifth through the eighth of the multipliers 46 has a connection to one of the image memories 42a or 42b. This connection is indirect via memory select 62b and then a zero select 66 which has an output directly connected to such first multiplier input. In expansion processor 50 as shown in FIG. 9, the outputs of a fifth and a sixth of the multipliers 46 are connected, respectively, to first and second inputs of a first of the adders 48, and the outputs of a seventh and an eighth of the multipliers 46 are connected, respectively, to first and second inputs of a second of the adders 48. The outputs of such first and second of the adders 48 are connected, respectively, to first and second inputs of a third of the adders 46. The output of this third adder is connected to the image output 18 as may be seen from FIGS. 8 and 9.

For both the reduction processor 40 and the expansion processor 50, MPY-8HUJ-1 and AM29516 multipliers, and F100180 and F100179 adders are to be utilized.

Both FIG. 6 and FIG. 9 are based on eight bits of resolution for the imagery. The eight bit by eight bit and sixteen bit by sixteen bit high speed multipliers 46 (50 nanosecond clocked multiply time) allow the processors, 40 and 50, to operate in a 100 nanosecond clock rate pipeline mode necessary for real time video pixel rate processing. The 24 bit adders 48 are implemented using ECL logic which provides a ten nanosecond addition time.

The image memory 42 provides temporary (one frame time) storage of the 512 wide by 480 high pixel array which is obtained by sampling the analog video 20 at approximately a ten megahertz (100 nanoseconds) rate. As noted above, in both reduction and expansion, the two image memories, 42a and 42b, are multiplexed so that while one memory, 42a or 42b, is in the input mode, the other is in the output mode. To provide a sufficient amount of storage in a reasonable amount of physical space, 64K bit RAM's, type F4164 integrated circuits, are recommended. Such chips have a 250 nanosecond access time which reasonably implies a 400 nanosecond cycle time. However, since a 100 nanosecond cycle time is required, the image memory 42 is implemented with something other than a simple 512×480 array architecture.

In the special implementation of memory chips for the image memory 42, several characteristics about the addressing of the image memory 42 are noted here.

1. Input/output addressing always proceeds in the row (horizontal line) direction.

2. In image reduction, the input is four randomly addressed pixels 30 within two consecutive lines of the image. The output is one sequentially addressed pixel 32 within one line of the image 18.

3. In image expansion, the input is one sequentially addressed pixel 30 within one line of the image 16. The output is four randomly addressed pixels 32 within two consecutive lines of the image (i.e., four adjacent pixels 30).

To allow sequential pixel addressing within a line, the image memory 42 is arranged in a grid structure as illustrated in FIG. 10. There are four groups of memory chips, 52, 54, 56, and 58, with each chip in only one group. This arrangement allows sequential pixel addressing of any row at a 100 nanosecond rate without addressing any single chip more often than every 400 nanoseconds.

No arrangement of the image memory 42 here allows the possibility of random pixel addressing. This possibility is implemented by using a scratch-pad memory which has the capability of operating in a read/modify/write mode at a 100 nanosecond cycle rate. The read/modify/write mode occurs during the reduction accumulation operation in which the modify consists of a ten nanosecond add. This cycle rate is made possible by the use of a very high speed emitter-coupled logic (ECL) RAM (type 93422 integrated circuits) which has a thirty nanosecond access time and a bit density of 1024 bits per chip. Three 512 pixel length line memories are needed in the scratch-pad memory. During reduction this scratch-pad is at the input of the input mode image memory 42 and during expansion it is at the output of the output mode image memory 42. During image reduction the reduction processor 40 randomly accumulates into two of the line memories, while the previously accumulated line is being sequentially written into the image memory 42 from the third line memory. During image expansion the expansion processor 50 randomly reads from two of the line memories, while the next line is being sequentially written into the third line memory from the image memory 42.

Having 24 bits of resolution for pixel accumulation, 36 1024 bit ECL RAM integrated circuits are required for the scratch-pad memory. A benefit of using a scratch-pad memory for accumulation is that only eight bits of resolution per pixel are required for the 512×480 image memory rather than 24 bits as shown in FIG. 6.

This approach allows implementation of the two image memories, 42a and 42b, using sixty-four 64K bit RAM integrated circuits.

The element memory 36 stores the value and location of the non-zero elements in [U] and [V] which have been calculated by the element calculator 34. For a 512×480 size image there are at most 1024 non-zero elements in [V] and 960 non-zero elements in [U]. Eight bits of resolution are required for the element value and nine bits (1 of 512) are required for resolution of the element location. Using 256×9 bit transistor-transistor logic (TTL) RAM (type 82S210) integrated circuits with sixty nanosecond access time, sixteen integrated circuits are required.

The element calculator 34 with a ten megahertz clock rate microprocessor has an element calculation time of 1.25 milliseconds. The alternative to calculating the non-zero elements for each scale factor in a microprocessor is to store the non-zero elements for every possible scale factor (there are 512) in a programmable read-only memory (PROM). Then the set of elements, for a desired scale factor, may be loaded from the PROM into the high-speed element memory 36. This requires 272 integrated circuits to store 8.12 megabits of data using 64K bit PROMS. However the number of PROM's can be reduced by a factor of four (to 68) by taking advantage of the relationship between the reduction and expansion elements in light of equation 10 above and the symmetry about the center which a set of elements possesses.

A memory select 62a selects the input data to the image memories 42a and b. A memory select 62b selects the output data of the image memories 42a and b. An address select 64 selects read and write addresses for image memories 42a and b. A zero select 66 selects background (zero) or valid image data under scale control or translation control. In the respective input and output images, there is a grey level coded object on a black or zero level background.

The publication entitled "Image scale, translation, and intensity transformations for real-time image generation" in *Applications of Digital Image Processing IV* in Volume 359 of the Proceedings of The International Society for Optical Engineering (SPIE), which was mailed out by the publisher to the subscribers shortly after Mar. 17, 1983, is incorporated herein by reference.

Obviously many modifications and variations of the present invention are possible in light of the above teachings. It is therefore to be understood that within the scope of the appended claims the invention may be practiced otherwise than as specifically described.

What is claimed is:

1. A video zoom processor which comprises:
    an image input;
    an image output;
    a translation factor input;
    an element calculator having a reduction factor input and having an output;
    an element memory having a first input connected to the output of the element calculator, having a second input, and having first, second, third and fourth outputs;
    an address select having a first input connected to the second output of the element memory, having second and third inputs, and having first and second outputs;
    a translation control having a first input connected to the first output of the element memory, having a second input connected to the translation factor input, having a third input, having a first output, and having a second output connected to the third input of the address select;

a counter having an output connected to the second input of the element memory, to the second input of the address select, and to the third input of the translation control;

a reduction processor having a first input, having a second input connected to the fourth output of the element memory, having a third input, and having an output;

a first memory select having a first input connected to the output of the reduction processor, having a second input connected to the image input, and having first and second outputs;

a first image memory having a first input connected to the first output of the first memory select, having a second input connected to the first output of the address select, and having an output;

a second image memory having a first input connected to the second output of the first memory select, having a second input connected to the second output of the address select, and having an output;

a second memory select having a first input connected to the output of the first image memory, having a second input connected to the output of the second image memory, having a first output, and having a second output connected to the third input of the reduction processor;

a zero select having a first input connected to the first output of the second memory select, having a second input connected to the first output of the translation control, having a zero input, and having an output; and an expansion processor having a first input connected to the output of the zero select, having a second input connected to the third output of the element memory, and having an output connected to the image output.

2. The video zoom processor of claim 1 wherein the reduction processor comprises:

a first multiplier having a first input connected to the fourth output of the element memory and a second input connected to the first output of the element memory, and having an output;

a second multiplier having a first input connected to the first output of the first multiplier and a second input connected to the second output of the element memory, and having an output;

a third multiplier having a first input connected to the second output of the element memory and a second input connected to the third output of the element memory, and having an output;

a fourth multiplier having a first input connected to the third output of the element memory and a second input connected to the fourth output of the element memory, and having an output;

a fifth multiplier having a first input connected to the image input, having a second input connected to the output of the first multiplier, and having an output;

a sixth multiplier having a first input connected to the image input, having a second input connected to the output of the second multiplier, and having an output;

a seventh multiplier having a first input connected to the image input, having a second input connected to the output of the third multiplier, and having an output;

an eighth multiplier having a first input connected to the image input, having a second input connected to the output of the fourth multiplier, and having an output;

a first adder having a first input connected to the output of the fifth multiplier, having a second input connected to the second output of the second memory select, and having an output connected to the first input of the first memory select;

a second adder having a first input connected to the output of the sixth multiplier, having a second input connected to the second output of the second memory select, and having an output connected to the first input of the first memory select;

a third adder having a first input connected to the output of the seventh multiplier, having a second input connected to the second output of the second memory select, and having an output connected to the first input of the first memory select; and a fourth adder having a first input connected to the output of the eighth multiplier, having a second input connected to the second output of the second memory select, and having an output connected to the first input of the first memory select.

3. The video zoom processor of claim 1 wherein the expansion processor comprises:

a first multiplier having a first input connected to the fourth output of the element memory and a second input connected to the first output of the element memory, and having an output;

a second multiplier having a first input connected to the first output of of the element memory and a second input connected to the second output of the element memory, and having an output;

a third multiplier having a first input connected to the second output of the element memory and a second input connected to the third output of the element memory, and having an output;

a fourth multiplier having a first input connected to the third output of the element memory and a second input connected to the fourth output of the element memory, and having an output;

a fifth multiplier having a first input connected to the output of the zero select, having a second input connected to the output of the first multiplier, and having an output;

a sixth multiplier having a first input connected to the output of the zero select, having a second input connected to the output of the second multiplier, and having an output;

a seventh multiplier having a first input connected to the output of the zero select, having a second input connected to the output of the third multiplier, and having an output;

an eighth multiplier having a first input connected to the output of the zero select, having a second input connected to the output of the fourth multiplier, and having a output;

a first adder having a first input connected to the output of the fifth multiplier, having a second input connected to the output of the sixth multiplier, and having an output;

a second adder having a first input connected to the output of the seventh multiplier, having a second input connected to the output of the eighth multiplier, and having an output; and a third adder having a first input connected to the output of the first adder, having a second input connected to the output of the second adder, and having an output connected to the image output.

* * * * *